United States Patent [19]
Zangenfeind et al.

[11] 3,823,888
[45] July 16, 1974

[54] APPARATUS FOR DETECTING AND GUIDING THE LEADERS OF PHOTOGRAPHIC ROLL FILMS

[75] Inventors: Helmut Zangenfeind, Puchheim; Erich Nagel, Anzing, both of Germany

[73] Assignee: Agfa-Gevaert Aktiengesellschaft, Leverkusen, Germany

[22] Filed: May 11, 1972

[21] Appl. No.: 252,416

[30] Foreign Application Priority Data
May 19, 1971  Germany............................ 2125084

[52] U.S. Cl.................................... 242/55, 242/65
[51] Int. Cl............................................ B65h 75/00
[58] Field of Search............ 242/67.1 R, 67.3 R, 55, 242/65, 75.52

[56] References Cited
UNITED STATES PATENTS
| | | | |
|---|---|---|---|
| 2,743,064 | 4/1956 | LeFebrre | 242/55 |
| 2,848,174 | 8/1958 | Pierce | 242/55 |
| 3,743,197 | 7/1973 | Hawkins | 242/67.1 R |

*Primary Examiner*—John W. Huckert
*Assistant Examiner*—Edward J. McCarthy
*Attorney, Agent, or Firm*—Michael S. Striker

[57] ABSTRACT

Apparatus for detecting, intercepting and guiding the leader of photographic film which is convoluted on a spool within a convoluted backing strip whose front portion extends beyond the leader of the film has a bearing which rotatably supports a spool and a drive which rotates the spool in a direction to pay out the film and the backing strip. A deflector is biased against the outermost convolution of the backing strip on the rotating spool to deflect the front portion of the backing strip into a first path while simultaneously preventing entry of the leader of film into a second path wherein the leader is to advance toward a splicing station to be joined with the trailing end of a preceding film. A photoelectric detector scans the path for the backing strip and produces a signal in response to detection of the front portion whereby such signal causes a rotary electromagnet to move the deflector out of register with the inlet of the path for the leader so that the leader can enter such path in response to further rotation of the spool. Prior to rotation in a direction to pay out the film and the backing strip, the spool is rotated to the opposite direction and is arrested by a tracking device having a nozzle which attracts the front portion of the backing strip in such angular position of the spool that the front portion of the backing strip is located between the points of engagement of the backing strip with the drive means and with the deflector. Such orienting of the spool can be carried out prior to introduction into the bearing.

23 Claims, 4 Drawing Figures

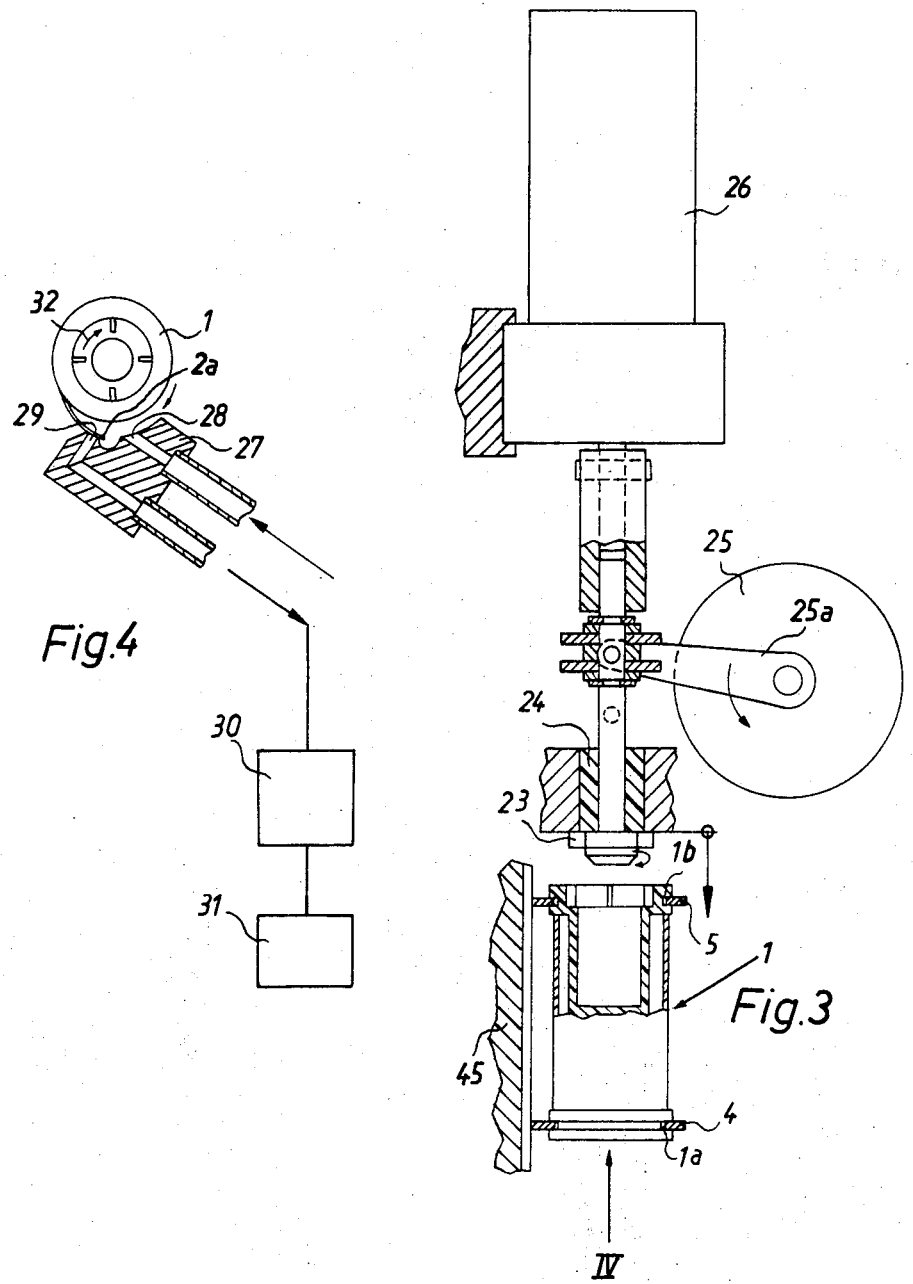

APPARATUS FOR DETECTING AND GUIDING THE LEADERS OF PHOTOGRAPHIC ROLL FILMS

CROSS-REFERENCE TO RELATED APPLICATION

A portion of the apparatus of the present invention constitutes an improvement over and a further development of a portion of the apparatus which is disclosed in the commonly owned copending application Ser. No. 182,979 filed Sept. 23, 1971 by Norbert SCHLAGHECK et al.

BACKGROUND OF THE INVENTION

The present invention relates to improvements in apparatus for manipulating spools with convoluted photographic film thereon, and more particularly to improvements in apparatus for detecting intercepting and guiding the leaders of convoluted photographic films on spools of the type wherein the film is convoluted within a flexible backing strip having a front portion which extends beyond the leader. Still more particularly, the invention relates to improvements in apparatus for manipulating customer films, especially for the purpose of automatically advancing the leaders of consecutive customer films to a splicing station where several discrete films are joined end-to-end in order to form a long web which is ready to be transported through developing, fixing, drying, printing, classifying and/or other stations.

It is already known to automatically open cassettes or containers for spools of convoluted photographic customer film, to thereupon automatically direct the leaders of films on consecutive spools into a predetermined path for travel toward a splicing station, and to splice the trailing end of a preceding film to the leader of the next-following film in order to prepare the films for transport through a developing, printing and/or other processing station. Problems arise in connection with spools whereon the exposed photographic film is convoluted within a backing strip which normally consists of paper and forms convolutions which alternate with the convolutions of film on the core of the spool. As a rule, the film adheres to the inner side of the backing strip and its length is selected in such a way that the front portion of the backing strip (namely, the free end of the outermost convolution of the backing strip) extends beyond the leader (free end of the outermost convolution) of film. Also, the trailing or innermost portion of the backing strip normally extends beyond the trailing or innermost portion of the film and is secured to the core of the spool. It is not difficult to detect or intercept the front portion of the backing strip on a spool, but it is much more difficult to invariably detect and intercept the leader of film in order to compel the leader to enter a predetermined path wherein the film advances toward the splicing station.

In many film processing establishments, the cassettes for spools of customer film within a backing strip are opened or broken up automatically but the removal of the outermost part of the backing strip as well as the introduction of the thus exposed leader of film into a predetermined path for transport to the splicing station is carried out by hand. This is a tedious and time-consuming operation, especially since it must be carried out in darkness.

The copending application Ser. No. 182,979 of Schlagheck et al. discloses an apparatus which relies on rigidity of the leader of customer film in order to insure that the leader is allowed or caused to enter a predetermined path for automatic transport to a splicing station. Such apparatus has been found to be quite satisfactory; however, the stiffness of the leader of customer film is a parameter which might vary from film to film so that it is not the most reliable means for controlling the direction of movement of customer film to the splicing station.

SUMMARY OF THE INVENTION

An object of the invention is to provide a novel and improved apparatus for detecting, intercepting and guiding the leaders of customer films which are convoluted on spools within a backing strip having a front portion which extends beyond the leader of film.

Another object of the invention is to provide a relatively simple, inexpensive, compact, reliable and versatile apparatus which can be used for automatic unwinding of backing strips and photographic films from spools upon removal of such spools from cassettes or analogous containers wherein the spools are mailed to a developing or printing plant.

A further object of the invention is to provide an apparatus whose operation is fully automatic, which can unwind a large number of customer films per unit of time, whose operation is practically independent of the diameter of the outermost convolution of backing strip on a spool, and which does not rely on the flexibility or lack of flexibility of the film and/or backing strip in order to insure that the leaders of successive films invariably find their way into a predetermined path for transport to a splicing station or directly into a developing or printing machine.

An additional object of the invention is to provide a novel and improved orienting device which can manipulate successive spools prior to introduction into the film directing and guiding apparatus or directly in such apparatus but prior to start of interception of the leader of convoluted film.

On feature of the invention resides in the provision of an apparatus for detecting, intercepting and guiding the leader of photographic film which is convoluted on a spool within a convoluted backing strip having a front portion which extends beyond the leader of film. The apparatus comprises bearing means for rotatably supporting a spool with convoluted film and backing strip thereon, drive means for rotating the spool in the bearing means in a direction to pay out the film and the backing strip, deflector means arranged to engage the outermost convolution of backing strip on the rotating spool and to deflect the front portion in a predetermined direction, first guide means defining a first path for the thus deflected front portion of the backing strip, second guide means defining a second path for the leader of film, blocking means which is movable to and from and normally assumes an operative position in which the front portion of the backing strip and/or the leader of film is prevented from entering the second path, detector means which is adjacent to the first path and serves to produce signals in response to detection of the front portion of backing strip, and displacing means for moving the blocking means from its operative position in response to signals from the detector means.

The just described apparatus positively prevents entry of the front portion of backing strip into the second path but exposes the inlet of the second path for entry of the leader of film in good time before the leader actually begins to move away from the next-to-the-outermost convolution of backing strip on the spool.

Another feature of the invention resides in the provision of an apparatus for orienting a spool prior to insertion of the spool into the bearing means or while the spool is supported in such bearing means. The orienting apparatus includes means for rotating the spool in a direction to collect the film (such means for rotating may but need not be the same as the aforementioned drive means), tracking means which is adjacent to the outermost convolution of backing strip on the thus rotated spool and serving to produce a signal in response to detection of the front portion of the backing strip, and means for arresting the rotating means in response to a signal from the tracking means to thus arrest the spool in an angular position in which the front portion of the backing strip is located between the point of engagement of backing strip with the drive means and the point of engagement of backing strip with the deflector means. This, together with the feature that the deflector means engages the backing strip downstream of the drive means (as considered in the direction of rotation of the spool) to pay out the film and the backing strip, insures that the front portion is engaged by the deflecting means almost immediately after the spool begins to rotate in a direction to pay out the backing strip, especially if the deflector means engages the backing strip close to the point where the backing strip is engaged by the drive means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary plan view of an orienting apparatus for moving the spool to a predetermined angular position prior to introduction into the apparatus of FIG. 1; and FIG. 4 is a schematic partly vertical sectional view of a portion of the orienting apparatus substantially as seen in the direction of arrow IV in FIG. 3.

DESCRIPTION OF THE PREFERRED EMBODIMENTS

Figure 1:
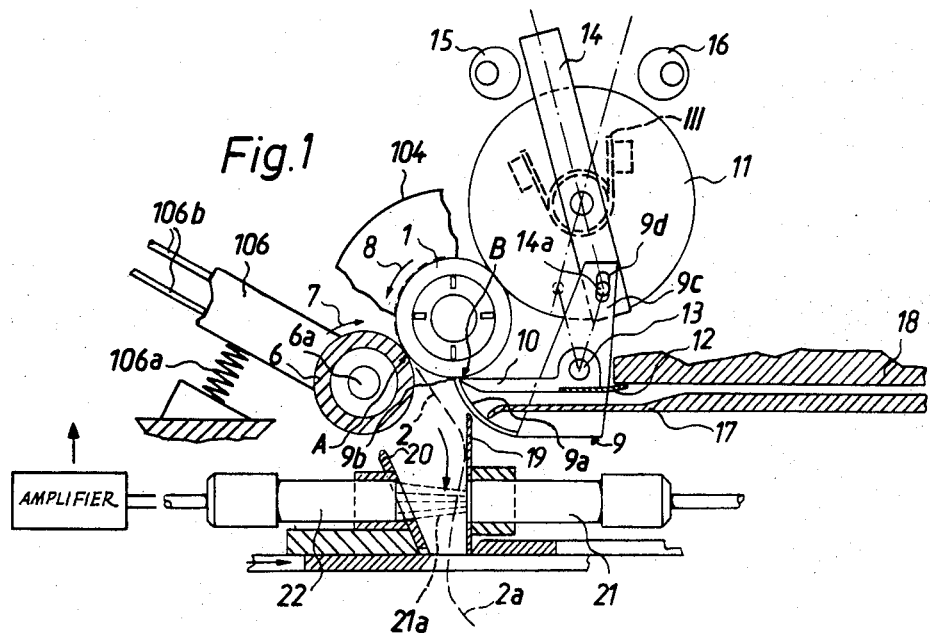
FIG. 1 is a diagrammatic partly elevational and partly longitudinal vertical sectional view of an apparatus for intercepting, directing and guiding the leader of photographic film which is convoluted on a rotatably mounted spool within a convoluted backing strip.

Referring first to FIG. 1, there is shown an apparatus for intercepting, directing and guiding the leader 3a (see FIG. 2) of photographic roll film 3 which is convoluted on a reel or spool 1. The film 3 is convoluted within a backing strip 2 which normally consists of paper and has a front portion 2a extending well beyond the leader 3a of convoluted film 3. The film 3 is glued to the inner side of the backing strip 2 and the trailing portion of the backing strip (not shown) extends beyond the trailing portion of the film 3 and is connected to the core (not shown) of the spool 1. It is assumed that the spool 1 has been removed from a cassette or container (not shown) which has been mailed or delivered by a customer to a photographic developing or printing plant. The manner in which the cassette or container is broken or otherwise opened in order to afford access to the spool 1 forms no part of the present invention. Reference may be had to the aforementioned copending application Ser. No. 182,979 of Schlagheck et al.

The spool 1 which has been removed from its container is mounted in a bearing structure in a predetermined angular position, namely, so that the front portion 2a of the backing strip 2 (this front portion 2a constitutes the free end of the outermost convolution of backing strip 2 on the spool 1) is located substantially in a 7 o'clock position, as viewed in FIG. 1. The apparatus which is capable of so orienting the spool 1 prior to insertion into the bearing structure of the apparatus shown in FIG. 1 will be described with reference to FIGS. 3 and 4. The bearing structure of FIG. 1 comprises a disk-shaped member 104 which receives and rotatably supports one axial end of the spool 1. A similar disk-shaped member (not shown in FIG. 1) is provided to support the other axial end of the spool 1. The two members of the bearing structure for the spool 1 shown in FIG. 1 are analogous to the bearing members 4 and 5 of the apparatus shown in FIG. 3. The illustrated bearing member 104 may consist of sheet metal and is preferably slotted so that the respective axial end of the spool 1 can be readily inserted or withdrawn. When the spool 1 is properly mounted in the bearing structure of the apparatus shown in FIG. 1, it can rotate about its axis and its orientation (save for its angular movement) remains at least substantially unchanged during removal of convoluted photographic film 3 from around its core.

The apparatus of FIG. 1 further comprises drive means which serves to rotate the spool 1 in the bearing structure in a direction (arrow 8) to pay out the backing strip 2 and the film 3. The drive means comprises a roller 6 which is secured to a shaft 6a rotatable in a supporting arm 106. The arm 106 is pivotably mounted in the frame of the apparatus and is biased by a helical spring 106a so that it urges the peripheral surface of the roller 6 against the spool 1. The means for rotating the roller 6 comprises a pulley (not shown) which is secured to the shaft 6a and is driven by a motor, not shown, through the intermediary of an endless belt 106b. The point where the peripheral surface of the roller 6 engages the outermost convolution of the backing strip 2 on the spool 1 is indicated by the reference character A. The roller 6 preferably comprises a cylindrical outer portion which consists of elastomeric material and serves to directly engage the outermost convolution of the backing strip 2 and/or the flange or flanges of the spool 1. It is preferred at this time to utilize a roller 6 having an axial length which is less than the axial length of the spool 1 and to place the peripheral surface of the elastomeric portion of this roller into direct engagement with the outermost convolution of the backing strip 2 on the spool 1 in the bearing means (member 104) of the apparatus shown in FIG. 1. The direction in which the roller 6 is rotated by the belt 106b in order to cause the spool 1 to pay out the backing strip 2 and film 3 is indicated by the arrow 7.

The apparatus of FIG. 1 further comprises a two-armed lever 9 which is pivotable on a fixed pin 13 and the lower arm of which has a tip 9b serving to engage the outermost convolution of the backing strip 2 on the spool 1 at a point B which is located about 45° downstream of the point A of engagement between the backing strip and the roller 6. The maximum distance between the points A and B preferably does not exceed 90°. The tip 9b constitutes a deflector which serves to deflect the front portion 2a away from the next-to-the-outermost convolution of the backing strip 2 on the spool 1 and to cause such front portion 2a to advance in a predetermined direction so that it automatically enters the relatively wide inlet of a path defined by a guide means including two mutually inclined fixed walls 19 and 20. The guide means including the walls 19 and 20 defines a substantially vertical path for the front portion 2a of the backing strip 2 wherein the front portion advances in response to deflection by the tip 9b of the lower arm of the lever 9.

FIG. 1 shows that the tip of deflector 9b is immediately adjacent to a second or auxiliary deflector 10 which is also pivotable on the pin 13 and is biased against the outermost most convolution of the backing strip 2 on the spool 1 by a leaf spring 12 mounted in the frame of the apparatus. The purpose of the auxiliary deflector 10 is to direct the leader 3a of photographic roll film 3 into a second path defined by a stationary guide means 18. The inlet of the second path is immediately adjacent to the tip or deflector 9b and is located upstream of the point B. The width of the deflectors 9b and 10, as considered in a direction at right angles to the plane of FIG. 1, is less than the width of the backing strip 2, and these deflectors engage the backing strip between the flanges of the spool 1.

The lever 9 is normally biased in a clockwise direction, as viewed in FIG. 1, by a torsion spring 111 which serves to normally maintain a rotary displacing electromagnet 11 in the angular position shown in FIG. 1. The torsion spring 111 engages a stop on the electromagnet 11 and reacts against a stationary portion of the frame of the apparatus. The upper arm 9c of the lever 9 has an elongated slot 9d for a pin 14a provided at the lower end of a motion transmitting member 14 which is secured to and shares all angular movements of the electromagnet 11. The motion transmitting member 14 normally abuts against an adjustable eccentric stop 15 under the action of the torsion spring 111. When the electromagnet 11 is energized, it causes the motion transmitting member 14 to turn in a clockwise direction, as viewed in FIG. 1, and to move into abutment with a second adjustable eccentric stop 16 whereby the pin 14a of the motion transmitting member 14 causes the lever 9 to pivot about the pin 13 in a counterclockwise direction and to move its deflector 9b away from engagement with the outermost convolution of backing strip 2 on the spool 1. That portion (9a) of the lower arm of the lever 9 which is immediately adjacent to the deflector or tip 9b constitutes a blocking device which prevents the front portion 2a of the backing strip and/or the leader 3a of the film 3 from entering the inlet of the path defined by the guide means 18 when the lever 9 dwells in the angular position shown in FIG. 1.

Such position of the lever 9 corresponds to the operative position of its blocking device 9a. When the electromagnet 11 is energized so that the motion transmitting member 14 abuts against the eccentric stop 16 (see FIG. 2), the blocking device 9a leaves its operative position and is moved out of the way so that the leader 3a is free to enter the path defined by the guide means 18. The deflector 9b is then located behind the wall 19 of the guide means for the backing strip 2.

It is clear that the torsion spring 111 can be replaced with a helical spring or with a leaf spring, and also that the leaf spring 12 which biases the auxiliary deflector 10 can be replaced by a helical spring one end of which is anchored in the frame of the apparatus and the other end of which is connected to the deflector 10.

Figure 2:
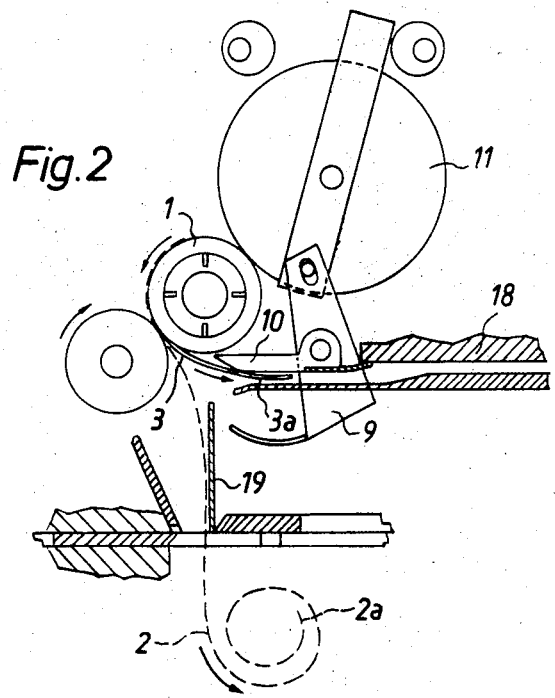
FIG. 2 illustrates some of the structure shown in FIG. 1 with the blocking means for the leader of film out of its operative position.

The guide means 18 for the film 3 is provided with an elongated tongue or extension 17 which has a downwardly bent left-hand end portion and is immediately or closely adjacent to the blocking device 9a when the latter dwells in the operative position of FIG. 1. The tongue 17 may consist of sheet metal or of a suitable synthetic plastic material. The walls 19 and 20 of the guide means for the backing strip 2 define a substantially funnel-shaped inlet of the path wherein the backing strip advances downwardly and is convoluted due to its natural tendency to curl in a manner as shown in FIG. 2. The wall 19 extends upwardly and across an imaginary tangent to the peripheral surface of the roller 6 at the point A to thus insure that the front portion 2a of the backing strip 2 is invariably caused to enter the space between the walls 19 and 20 when the spool 1 rotates in the direction indicated by the arrow 8 and the front portion 2a is deflected by the deflector 9a of the lever 9.

The apparatus further comprises a detector, preferably a contactless detector which constitutes a photoelectric detecting or scanning device. This detector includes a light source 21 which is mounted in or behind the wall 19 and directs a beam 21a of non-actinic light across the path for the backing strip 2 so that such light normally impinges upon a photosensitive element 22 which is mounted behind the wall 20. The wall 19 has a suitable opening to permit the beam 21a of nonactinic light to impinge upon the photosensitive surface of the element 22 which is located behind a suitable opening in the wall 20. The photosensitive element 22 produces a signal when the light beam 21a is interrupted by the front portion 2a of the backing strip 2. Such signal is amplified by an amplifier (which is shown to the left of the photosensitive element 22) and is transmitted to the circuit of the electromagnet 11 whereby the electromagnet causes the motion transmitting member 14 to move away from the stop 15 against the opposition of the torsion spring 111 and to move into abutment with the stop 16 so that the deflector 9b and the blocking device 9a of the lever 9 assume the inoperative or retracted positions shown in FIG. 2. The light which issues from the source 21 is preferably in the infra-red range of the spectrum to make sure that such light cannot adversely affect the photographic film 3 while such film is being deflected by the member 10 and advances along the path defined by the guide means 18. The threshold value of the signal furnished by the amplifier shown in FIG. 1 is preferably adjustable so as to make sure that the electromagnet 11 can be energized with appropriate delay following an interruption of the light beam 21a by the front portion 2a of the backing strip 2. As mentioned before, the front portion 2a of the backing strip 2 normally extends well beyond the leader 3a of the film 3 so that there is sufficient time to energize the electromagnet 11 after the front portion 2a is deflected into the inlet of the path defined by the walls 19 and 20.

FIGS. 3 and 4 illustrate an orienting apparatus or device which serves to place a spool 1 into the aforedescribed angular position prior to mounting of the spool 1 in the bearing member 104 of FIG. 1 or while the spool is mounted in the member 104. It is assumed that the apparatus of FIGS. 3 and 4 comprises its own bearing structure for rotatably supporting a spool 1 in a position as shown in FIGS. 3 and 4. The bearing structure comprises a pair of axially spaced disk-shaped bearing members 4 and 5 which are mounted on a support 45 and are preferably slotted so that they can be readily opened or deformed in order to permit introduction of the respective axial ends of a spool 1. As shown in FIG. 3, the bearing members 4 and 5 respectively extend into circumferential sealing grooves 1a and 1b at the axial ends of the spool 1. Such sealing grooves are normally provided in the spool to insure satisfactory engagement with the cassettes wherein the spools are mounted to facilitate manipulation during exposure of film 3 in a photographic apparatus. The grooves 1a, 1b and those portions of a cassette which extend into such grooves form a labyrinth seal which prevents entry of light into the interior of an intact cassette. The bearing member 104 of the bearing structure shown in FIG. 1 is preferably identical with the bearing member 4 of FIG. 3, and the other bearing member of the apparatus shown in FIG. 1 is preferably identical with the bearing member 5 of FIG. 3.

The orienting apparatus further comprises a rotatable and axially movable shaft 23 which registers with and is adjacent to one axial end of a spool 1 in the bearing members 4, 5. The means for shifting the shaft 23 axially comprises a rotary electromagnet 25 having an arm 25a provided with a fork which engages a suitably configured sleeve on the shaft 23. The means for rotating the shaft 23 comprises a motor 26 which can rotate the shaft while the latter moves axially in response to energization or deenergization of the electromagnet 25. The reference character 24 denotes the guide means for the front portion of the shaft 23. The head of this shaft is configured in such a way that it can enter into the recess at the respective end of the spool 1 in the bearing member 4, 5 and to rotate the spool in response to starting of the motor 26.

The orienting apparatus also comprises a pneumatic tracking or detecting device 27 having a width which is less than the distance between the bearing members 4 and 5 of FIG. 3 so that this tracking device or detector can be placed closely adjacent to the outermost convolution of backing strip 2 on the spool 1 in the bearing members 4 and 5. As shown in FIG. 4 the tracking device 27 includes a blowing nozzle 28 serving to discharge a stream of compressed air substantially tangentially of the spool 1 while the spool is being rotated (see arrow 32) in a direction to collect the film 3 and the backing strip 2. The tracking device 27 further comprises a substantially radially extending suction nozzle 29 which serves to attract the front portion 2a of the rotating backing strip 2 on the spool 1 and to thereby produce a signal which is amplified in an amplifier 30 and is transmitted to a switching circuit 31 constituting a means for arresting the motor 26 in immediate response to attraction of the front portion 2a by the suction nozzle 29. The position of the tracking device 27 is selected in such a way that, when the motor 26 is arrested in response to a signal from the suction nozzle 29 by way of the amplifier 30 and switching circuit 31, the spool 1 assumes an optimum angular position for insertion into the apparatus of FIG. 1, namely, so that the front portion 2a of the backing strip 2 is located immediately downstream of the point A and upstream of the point B where the deflector 9b engages the outermost convolution of the backing strip 2 on the spool 1 which is held by the bearing member 104. The stream of compressed air which issues from the blowing nozzle 28 while the spool 1 rotates in the direction indicated by the arrow 32 serves to move the front portion 2a of the backing strip 2 away from the next-to-the-outermost convolution of the backing strip and to thus enable the nozzle 29 to attract the front portion 2a in order to arrest the motor 26 and to bring the spool 1 to a halt in an optimum angular position for introduction into the apparatus of FIG. 1. The angular distance between the outlet of the blowing nozzle 28 and the inlet of the suction nozzle 29, as considered in the circumferential direction of the spool 1 in the bearing members 4 and 5, is about 45° but may be increased to about 90°. The nozzle 28 is located upstream of the nozzle 29, as considered in the direction of rotation of the spool 1 by the motor 26. The exact construction of the pneumatic amplifier 30 and of the switching circuit 31 which receives signals from the amplifier 30 forms no part of the present invention.

The operation:

A spool 1 with convoluted film 3 and a backing strip 2 thereon is removed from a cassette in a manner as disclosed in the copending application Ser. No. 182,979. The spool 1 is thereupon inserted into the bearing members 4, 5 of FIG. 3 in such a way that the members 4 and 5 respectively extend into its grooves 1a and 1b. The electromagnet 25 is energized to pivot its arm 25a in a counterclockwise direction, as viewed in FIG. 3, whereby the head of the shaft 23 is introduced into the adjacent recess at the upper axial end of the spool 1 and is drivingly connected thereto. In the next step, the motor 26 is started and begins to rotate the shaft 23 in the direction indicated by arrow 32 shown in FIG. 4. Consequently, the spool 1 in the bearing members 4, 5 rotates in a direction to collect the film 3 and the backing strip 2 while the nozzle 28 blows a tangential stream of compressed air to move the front portion 2a of the backing strip away from the next-to-the-outermost convolution of the backing strip on the rotating spool 1. most convolution of the backing strip on the rotating spool 1. When the front portion 2a reaches the inlet of the nozzle 29, it is attracted to the tracking device 27 and the nozzle 29 causes the amplifier 30 to furnish to the switching circuit 31 a signal which arrests the motor 26 at a time when the spool 1 assumes an optimum angular position for transfer into the apparatus of FIG. 1. The apparatus which breaks up the cassettes or spools 1 can be equipped with automatic means for withdrawing or retaining the thus freed spool 1 and for automatically inserting the spool into the bearing members 4 and 5 of FIG. 3. The purpose of rotation of the spool 1 in the direction indicated by the arrow 32 shown in FIG. 4 is twofold. First, the motor 26 serves to rotate the spool 1 in a direction to collect the film 3 and the backing strip 2 in order to insure that the front portion 2a which might have been unwound during removal of the spool 1 from its cassette is properly convoluted on the spool. Secondly, such rotation of the spool 1 insures that the front portion 2a of the backing strip 2 invariably moves into the range of the suction nozzle 29 whereby such movement is assisted by the stream of compressed air issuing from the blowing nozzle 28. The stoppage of motor 26 in response to a signal from the amplifier 30 can be readily timed in such a way that the spool 1 is arrested in an optimum position for introduction into the apparatus of FIG. 1. The developing or printing plant which utilizes the apparatus of FIG. 1 and of FIGS. 3–4 is preferably provided with automatic transfer means (not shown) which can remove the spool 1 from the bearing members 4, 5 of FIG. 3 and transfer the spool into the bearing structure of FIG. 1 in such a way that the front portion 2a of the backing strip 2 is located between the points A and B. However, it is also within the scope of the invention to rotate the spool 1 in the direction indicated by the arrow 32 while the spool is mounted in the bearing structure of FIG. 1 and to automatically arrest the spool in an angular position in which the front portion 2a of the backing strip 2 is located between the points A and B. This is possible if there is sufficient room for the tracking device 27 in spite of the provision of roller 6 and deflectors 9b and 10. If the apparatus of FIGS. 3 and 4 is incorporated into the apparatus of FIG. 1, the motor which drives the belt 106b can rotate the roller 6 in two directions, namely, in and counter to the direction indicated by the arrow 8.

The apparatus of FIGS. 3 and 4 renders it possible to prepare a spool 1 for transfer into the apparatus of FIG. 1 while a spool in the apparatus of FIG. 1 is being relieved of its film 3. This contributes to greater output of the printing or developing plant, especially if the printing plant is provided with automatic transfer means for moving spools from the bearing members 4, 5 of FIG. 3 into the bearing structure of FIG. 1. The automatic transfer means can move a spool which has been removed from the bearing members 4, 5 of FIG. 3 either axially or sideways, depending on the position of the orienting apparatus relative to the position of the roller 6 and bearing member 104 of FIG. 1. For example, the shaft 23 of FIG. 3 may serve as a means for automatically expelling a spool 1 from the bearing members 4, 5 and for introducing such spool into the bearing structure of FIG. 1.

Once a spool 1 has been introduced into the apparatus of FIG. 1 so that the front portion 2a of the backing strip 2 is located between the points A and B, the motor which drives the belt 106b is started and rotates the roller 6 in a clockwise direction (arrow 7) while the deflectors 9b and 10 assume the positions as shown in FIG. 1. Such positioning of the spool 1 prior to starting of the roller 6 insures that the roller 6 invariably causes the front portion 2a to move against and to thereupon slide along the left-hand surface of the upright wall 19. It is to be recalled that the material of the backing strip 2 is readily flexible so that the insertion of a spool 1 into the bearing member 104 in such position that the front portion 2a will be located upstream of the roller 6 could cause undue deformation of the backing strip during passage along the point A. If the front portion 2a happens to abut against the adjacent portion of the backing strip 2 on the spool 1, it is stripped off by the deflector 9b so that it invariably enters the inlet of the path defined by the walls 19 and 20.

When the front portion 2a of the backing strip 2 interrupts the light beam 21a in the space between the walls 19 and 20, the detector including the light source 21 and the photosensitive element 22 produces a signal which is amplified by the amplifier shown in FIG. 1 and causes the rotary electromagnet 11 to turn the motion transmitting member 14 into abutment with the stop 16. This causes the lever 9 to turn in a counterclockwise direction about the axis of the pivot pin 13 and to stress the spring 111. Consequently, the blocking device 9a of the lever 9 moves from its operative position and assumes the retracted position shown in FIG. 2, together with the deflector 9b. Therefore, the leader 3a of film 3 is free to enter the path defined by the guide means 18 and to advance toward the splicing station (not shown) in response to further rotation of the spool 1 in the direction indicated by the arrow 8. If desired, the signal which is furnished by the photosensitive element 22 can also serve to turn off the light source 21 because the detector need not remain operative after it has detected the front portion 2a of the backing strip 2. Such opening of the circuit of the light source 21 is desirable in order to prevent any possibility of affecting the exposed film 3 by light which forms the beam 21a. Thus, the provision of a light source 21 which furnishes a non-actinic light is not essential because such light source can be turned off before the leader 3a of film 3 on the spool 1 in the bearing member 104 is exposed.

As the spool 1 continues to rotate in the direction indicated by the arrow 8, successive increments of the backing strip 2 advance between the walls 19 and 20 and form convolutions which are shown in the lower part of FIG. 2 by broken lines. When the entire backing strip is withdrawn, it is broken off or allowed to descend by gravity into a collecting receptacle or onto a moving take-off conveyor, not shown.

The purpose of the auxiliary deflector 10 is to insure that the leader 3a of film 3 invariably finds its way into the inlet of the path defined by the guide means 18. AS shown, the inlet of the path defined by the guide means 18 flares outwardly between the tip of the deflector 10 and the left-hand end of the tongue 17 to further facilitate entry of the leader 3a into the guide means 18. It is to be borne in mind that the leader 3a tends to curl in a counterclockwise direction, as viewed in FIG. 1 (see FIG. 2), so that it will slide along the suitably curved underside of the deflector 10 and automatically finds its way into the guide means 18. If desired, the wall 19 can be provided with serrations or teeth which promote the sliding movement of front portion 2a of the backing strip into the space defined by the walls 19 and 20. Similar serrations can be provided on the deflector 10 for the purpose of preventing entry of the front portion 2a into the guide means. It is also possible to extend the wall 19 upwardly beyond the position shown in FIG. 1 and to provide the upper portion of such wall with a slot for the deflector 9b and blocking device 9a and to provide serrations on the outer or left-hand surface of the blocking portion 9a in order to further reduce the likelihood of entry of the front portion 2a of backing strip 2 into the path defined by the guide means 18. Still further, the wall 19 may be made of an elastic material and may exhibit a tendency to flex in a direction to the left beyond the position shown in FIGS. 1 and 2 in immediate response to movement of the blocking device 9a to the position shown in FIG. 2 to thereby further reduce the likelihood of entry of the front portion 2a into the space to the right of the wall 19. Such mounting and construction of the wall 19 simultaneously increases the inlet of the path for the leader 3a in order to insure that the leader invariably finds its way into the guide means 18.

The apparatus of FIG. 1 may be further provided with means for trimming the leader 3a of film 3 in the guide means 18. Such trimming means is not shown in the drawing. Also, the speed of the roller 6 and hence the speed at which the spool 1 rotates in the direction indicated by the arrow 8 can be increased as soon as the leader 3a enters the path defined by the guide means 18. The speed of the spool 1 is controlled or determined only by the nature of the splicing device where the leader 3a is joined with the trailing end of the preceding film 3. When the entire film has been introduced into the guide means 18, the spool 1 can be expelled from the bearing member 104, for example, by resorting to a plunger (not shown) which is movable at right angles to the plane of FIG. 1. Also, the lever 9 is thereupon returned to the position shown in FIG. 1 so that the deflector 9b and the blocking device 9a of this lever reassume their operative positions. The motion transmitting member 14 then abuts against the stop 15 and the apparatus of FIG. 1 is ready to receive the next spool 1 from the orienting apparatus of FIGS. 3 and 4.

The deflector 10 constitutes an optional feature of the apparatus shown in FIG. 1. The guide means 18 can be moved so close to the periphery of the spool 1 in the bearing member 104 that the leader 3a of film 3 automatically enters the respective path even if the auxiliary deflector 10 is omitted. This is possible especially if the detector 21, 22 is remote from the inlet of the path which is defined by the walls 19 and 20. It is also possible to replace this deflector with a pneumatic or mechanical detecting device.

It is further clear that the orienting apparatus of FIGS. 3 and 4 can be used with advantage in other printing and/or developing plants, not only in plants which utilize the apparatus of FIG. 1. For example, the orienting apparatus of FIGS. 3 and 4 can be used in apparatus which is disclosed in the aforementioned copending application Ser. No. 182,979.

The operation of the apparatus shown in FIG. 1 is based on the recognition that the front portion 2a of a backing strip 2 invariably extends well beyond the leader 3a of convoluted photographic film 3. Therefore, this apparatus can be provided with a deflector for the front portion 2a and need not rely on the flexibility of backing strip and/or the stiffness of leader 3a in order to make sure that the backing strip is introduced into the desired path and does not enter the path which is intended only for the leader of the photographic film. The likelihood that the front portion 2a would enter the path defined by the guide means 18 is further reduced by the provision of blocking device 9a which positively seals the inlet of the path defined by the guide means 18 during travel of the front portion 2a into the range of the detector 21, 22. Another advantage of the apparatus of FIG. 1 is that the front portion 2a is deflected into the path defined by the walls 19 and 20 practically immediately in response to start of rotation of the spool 1 by way of the roller 6. Such construction renders it unnecessary to provide a guide structure for the front portion 2a which would extend all the way around the periphery of the spool 1 in the bearing member 104. Moreover, since the front portion 2a is invariably located between the points A and B when the rotation of spool 1 in the direction of the arrow 8 begins, it is possible to place the detector 21, 22 at such a distance from the point A as is necessary to insure that the blocking device 9a will be moved from the operative position of FIG. 1 to the inoperative position of FIG. 2 not later than when the leader 3a reaches the auxiliary deflector 10. In other words, accurate orientation of the spool 1 prior to rotation in the direction indicated by the arrow 8 renders it possible to determine with sufficient accuracy the time delay which is necessary to move the blocking device 9a from the operative position after the spool 1 begins to rotate in response to rotation of the roller 6.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. Apparatus for intercepting the leader of photographic film which is convoluted on a spool within a convoluted backing strip having a front portion extending beyond the leader, comprising bearing means for rotatably supporting a spool with convoluted film and backing strip thereon; drive means for rotating the spool in said bearing means in a direction to pay out the film and the backing strip; deflector means mounted for engagement with the outermost covolution of said backing strip on the rotating spool and to thus deflect the front portion of said backing strip in a predetermined direction; first guide means defining a first path for the thus deflected front portion of the backing strip; second guide means defining a second path for the leader of the film; blocking means movable to and from and normally assuming an operative position in which the leader of the film is prevented from entering said second path; detector means mounted adjacent to said first path and including means for producing signals in response to detection of the front portion of the backing strip; and displacing means operative to move said blocking means from said operative position in response to said signals.

2. Apparatus as defined in claim 1, wherein said drive means includes means for engaging the backing strip or the spool in said bearing means at a first point and said deflector means engages such backing strip at a second point located downstream of said first point, as considered in the direction of station of the spool in said bearing means, said first guide means having an inlet positioned to receive the front portion of a backing strip which is deflected in said predetermined direction.

3. Apparatus as defined in claim 2, further comprising means for maintaining the front portion of said backing strip between said points when the respective spool is mounted in said bearing means and prior to rotation of such spool by said drive means.

4. Apparatus as defined in claim 1, further comprising means for biasing said deflector means against the outermost convolution of backing strip on the spool in said bearing means.

5. Apparatus as defined in claim 1, wherein said deflector means forms part of said blocking means and is disengaged from the backing strip on the spool in said bearing means in response to movement of said blocking means from said operative position.

6. Apparatus as defined in claim 1, further comprising means for moving said deflector means between a first position in which said deflector means cooperates with said blocking means to prevent entry of the leader of film into said second path and engages the backing strip on the spool in said bearing means and a second position in which said deflector means is disengaged from the backing strip and allows the leader of film to enter said second path in response to continuing rotation of the spool in said bearing means.

7. Apparatus as defined in claim 6, wherein said displacing means constitutes said means for moving said deflector means, said deflector means being moved to said second position in response to said signals.

8. Apparatus as defined in claim 1, wherein said displacing means comprises a rotary electromagnet.

9. Apparatus as defined in claim 8, wherein said deflector means is rigid with said blocking means and is moved from engagement with the backing strip on the spool in said bearing means in response to movement of said blocking means from said operative position.

10. Apparatus as defined in claim 1, wherein said detector means comprises a device for contactless scanning of said first path for the presence of the front portion of the backing strip.

11. Apparatus as defined in claim 10, wherein said device is a photoelectric detector including a light source directing a beam of light across said first path and a photosensitive element exposed to said light beam and producing a signal when the light beam is interrupted by the front portion of a backing strip in said first path.

12. Apparatus as defined in claim 11, wherein said light beam is a beam of nonactinic light.

13. Apparatus as defined in claim 12, wherein said nonactinic light is infrared light.

14. Apparatus as defined in claim 1, wherein said drive means comprises a yieldably mounted driven roller which engages the outermost convolution of the backing strip on the spool in said bearing means.

15. Apparatus as defined in claim 14, wherein at least that portion of said roller which is adjacent to its peripheral surface consists of elastomeric material.

16. Apparatus as defined in claim 14, wherein the peripheral surface of said roller engages the backing strip on the spool in said bearing means at a first point and said deflector means engages such backing strip at a second point located downstream of said first point, as considered in the direction of rotation of the spool in said bearing means.

17. Apparatus as defined in claim 16, wherein the angular distance between said first and second points is less than 90 degrees.

18. Apparatus as defined in claim 1, further comprising second deflector means arranged to engage the outermost convolution of the backing strip on the spool in said bearing means downstream of the point of engagement between the backing strip and said first mentioned deflector means so as to direct the leader of film into said second path upon entry of the front portion of the backing strip into said first path and subsequent to movement of said blocking means from said operative position.

19. Apparatus as defined in claim 18, further comprising means for biasing said second deflector means against the backing strip on the spool in said bearing means.

20. Apparatus as defined in claim 18, wherein said first path has an inlet located immediately upstream of said first mentioned deflector means, as considered in the direction of rotation of the spool in said bearing means, said second path having an inlet located immediately downstream of the point of engagement between said first mentioned deflector means and the backing strip on the spool in said bearing means.

21. Apparatus as defined in claim 20, wherein the inlet of said first path tapers in a direction away from the spool in said bearing means.

22. Apparatus as defined in claim 18, wherein said first mentioned and said second deflector means are pivotable about a common axis.

23. Apparatus as defined in claim 18, wherein said second deflector means and said blocking means are pivotable about a common axis.

* * * * *